(12) United States Patent
Smith et al.

(10) Patent No.: US 7,736,518 B2
(45) Date of Patent: *Jun. 15, 2010

(54) SEPARATING MIXTURES OF OIL AND WATER

(75) Inventors: Kevin W. Smith, Houston, TX (US); Robert L. Sloan, Katy, TX (US); Harry D. Smith, Jr., Montgomery, TX (US)

(73) Assignee: Total Separation Solutions, LLC, Houston, TX (US)

( * ) Notice: Subject to any disclaimer, the term of this patent is extended or adjusted under 35 U.S.C. 154(b) by 500 days.

This patent is subject to a terminal disclaimer.

(21) Appl. No.: 11/702,857

(22) Filed: Feb. 6, 2007

(65) Prior Publication Data

US 2007/0144785 A1 Jun. 28, 2007

Related U.S. Application Data

(63) Continuation-in-part of application No. 11/352,889, filed on Feb. 13, 2006, now Pat. No. 7,201,225.

(60) Provisional application No. 60/652,549, filed on Feb. 14, 2005, provisional application No. 60/652,711, filed on Feb. 14, 2005.

(51) Int. Cl.
*B01D 17/04* (2006.01)

(52) U.S. Cl. .................. 210/708; 166/267; 175/66; 210/712; 210/718; 210/737; 210/738; 210/748.01; 210/774

(58) Field of Classification Search ............ 210/708
See application file for complete search history.

(56) References Cited

U.S. PATENT DOCUMENTS

| | | | | |
|---|---|---|---|---|
| 2,864,502 A * | 12/1958 | May | .......................... | 210/774 |
| 3,594,314 A * | 7/1971 | Bilhartz et al. | .............. | 210/708 |
| 5,188,090 A | 2/1993 | Griggs | | |
| 5,279,262 A | 1/1994 | Muehleck | | |
| 5,385,298 A | 1/1995 | Griggs | | |
| 5,472,620 A | 12/1995 | Huang | | |
| 5,951,456 A * | 9/1999 | Scott | ......................... | 516/195 |
| 5,957,122 A | 9/1999 | Griggs | | |
| 6,555,009 B2 * | 4/2003 | Varadaraj | ..................... | 210/708 |
| 6,596,178 B1 * | 7/2003 | Archibald et al. | ........... | 210/774 |
| 6,627,784 B2 | 9/2003 | Hudson | | |
| 6,666,906 B2 | 12/2003 | Hallman | | |
| 7,201,225 B2 * | 4/2007 | Smith et al. | ............ | 166/250.01 |
| 7,404,903 B2 * | 7/2008 | Bozak et al. | ................ | 210/708 |
| 7,546,874 B2 * | 6/2009 | Smith et al. | ................ | 166/267 |
| 7,568,523 B2 * | 8/2009 | Smith et al. | ................ | 166/267 |

* cited by examiner

*Primary Examiner*—Peter A Hruskoci
(74) *Attorney, Agent, or Firm*—William L. Krayer

(57) ABSTRACT

A cavitation device is used to heat and facilitation the separation of mixtures and emulsions of oil and water. Waste heat from the power source for the cavitation device may be utilized to elevate the temperature of incoming mixtures or emulsions. The heated mixture of emulsion is sent to a separation vessel where vapor may be removed and/or recovered, and where oil is removed as it separates into an identifiable layer. The separation vessel may be a flash tank.

22 Claims, 3 Drawing Sheets

SEPARATING MIXTURES OF OIL AND WATER

RELATED APPLICATION

This is a continuation-in-part of and claims the full benefit of application Ser. No. 11/352,889, filed Feb. 13, 2006, now U.S. Pat. No. 7,201,225, which in turn claims the benefit of provisional applications 60/652,549 filed Feb. 14, 2005 and 60/652,711 filed Feb. 14, 2005.

TECHNICAL FIELD

A cavitation device is used to heat emulsions and other mixtures of oil and water to facilitate the removal of water by vaporization.

BACKGROUND OF THE INVENTION

Emulsions and other mixtures of oil and water are not conducive to conventional distillation as a way of breaking the emulsion or separating one of the components from the other Conventional distillation methods of concentrating such compositions too often result in scaling and other difficulties which ultimately frustrate the economics of distillation and/or recovering or recycling the components of the mixture; frequently also, the composition of the oil is altered by the time-temperature regime in the distillation process A more economical and practical method is needed for separating the components of oil and water mixtures and emulsions.

SUMMARY OF THE INVENTION

This invention separates the components of emulsions and other mixtures of oil and water by passing them through a cavitation device which generates shock waves to heat the fluid and remove moisture, thereby increasing the ratio of oil to water in the composition, frequently to the point where all the water is removed. The cavitation device may be one manufactured and sold by Hydro Dynamics, Inc., of Rome, Ga., notably the device described in U.S. Pat. Nos. 5,385,298, 5,957,122 6,627,784 and particularly 5,188,090, all of which are incorporated herein by reference in their entireties. In recent years, Hydro Dynamics, Inc. has adopted the trademark "Shockwave Power Reactor" for its cavitation devices, and we use the term SPR herein to describe the products of this company and other cavitation devices that can be used in our invention.

Unlike a conventional distillation process, the SPR preserves the ratios of the cations and anions to each other in the water that enters the SPR with the oil, while it heats the water to facilitate the generation of water vapor. A conventional distillation process would tend to scale out some of the constituents.

Definition: We use the term "cavitation device," or "SPR," to mean and include any device which will impart thermal energy to flowing liquid by causing bubbles or pockets of partial vacuum to form within the liquid it processes, the bubbles or pockets of partial vacuum being quickly imploded and filled by the flowing liquid. The bubbles or pockets of partial vacuum have also been described as areas within the liquid which have reached the vapor pressure of the liquid. The turbulence and/or impact, which may be called a shock wave, caused by the implosion imparts thermal energy to the liquid, which, in the case of water, may readily reach boiling temperatures. The bubbles or pockets of partial vacuum are typically created by flowing the liquid through narrow passages which present side depressions, cavities, pockets, apertures, or dead-end holes to the flowing liquid; hence the term "cavitation effect" is frequently applied, and devices known as "cavitation pumps" or "cavitation regenerators" are included in our definition. Steam or vapor generated in the cavitation device can be separated from the remaining, now concentrated, water and the oil in the mixtures and emulsions which the invention treats. The term "cavitation device" includes not only all the devices described in the above itemized U.S. Pat. Nos. 5,385,298, 5,957,122, 6,627,784 and 5,188,090 but also any of the devices described by Sajewski in U.S. Pat. Nos. 5,183,513, 5,184,576, and 5,239,948, Wyszomirski in U.S. Pat. No. 3,198,191, Selivanov in U.S. Pat. No. 6,016,798, Thoma in U.S. Pat. Nos. 7,089,886, 6,976,486, 6,959,669, 6,910,448, and 6,823,820, Crosta et al in U.S. Pat. No. 6,595,759, Giebeler et al in U.S. Pat. Nos. 5,931,153 and 6,164,274, Huffman in U.S. Pat. No. 5,419,306, Archibald et al in U.S. Pat. No. 6,596,178 and other similar devices which employ a shearing effect between two close surfaces, at least one of which is moving, such as a rotor, and/or at least one of which has cavities of various designs in its surface as explained above.

We are able to separate water from mixtures of oil and water whether or not they are technically emulsified. Where they are emulsified, they may be in the emulsified state with or without the aid of one of the many chemicals known to be effective emulsification agents, and they may be in the form of oil-in-water or water-in-oil. We include within the oil and water fluids that can benefit from our invention any combination of oil and water—that is, even where a substantial portion of the two components have already separated into layers. Any kind of oil is contemplated, so long as the oil has a boiling point higher than the boiling point of water. Oil and water mixtures and emulsions used in our invention may be referred to herein as "oil and water mixtures."

Our invention includes the optional step of filtering the oil and water mixture to be dewatered by the SPR or after passing it through the SPR. Typically, in the prior art, the oil and water mixtures are filtered, if at all, before they are stored, distilled, or subjected to other types of separation. Our invention enables the postponement of filtration until after the mixture is dewatered by passing through the SPR; filters and the filtration process can therefore be engineered more efficiently to handle smaller volumes of liquid with perhaps higher concentrations of solids. Thus our invention includes a process of dewatering an oil and water mixture comprising passing the mixture through a cavitation device to facilitate removal of vapor or steam and then filtering the concentrated fluid thus obtained. Persons skilled in the art will readily see that filtering significant quantities of solids after water removal rather than before contrasts dramatically with a distillation process. Of course it may be desirable in some cases to filter before passing the fluid into the SPR, or to filter both before and after.

In another aspect, our invention includes a method of processing an oil and water mixture comprising optionally filtering the oil and water mixture, passing the mixture through a heat exchanger utilizing heat from a power source such as the exhaust of a Diesel engine, powering a cavitation device with the power source, passing the mixture through the cavitation device to increase the temperature thereof, optionally recycling at least some of the mixture through the cavitation device to further increase the temperature of the oil and water mixture, passing the mixture into a flash tank or other separation vessel to separate steam and vapor from the mixture and to obtain an at least partially dewatered fluid, and recovering oil from the dewatered fluid. The use of a Diesel engine is not essential; persons skilled in the art will realize that the cavitation device may be powered by any more or less equivalent source of mechanical energy, such as a common internal combustion engine, a steam engine, an electric motor (see FIG. 1a), or the like. Waste heat from any of these, either in an exhaust gas or otherwise, may be utilized in a known manner to warm the oil well fluid before passing it into the SPR.

While the SPR is quite capable of elevating the temperature of an emulsion or mixture of oil and water to or above the boiling point of water at atmospheric pressure or higher, it is not essential in our process for it to do so, as the flash tank or other separation vessel may be operated under a vacuum to draw off vapors at temperatures below the boiling point at atmospheric pressure.

DETAILED DESCRIPTION OF THE INVENTION

Figure 1A:
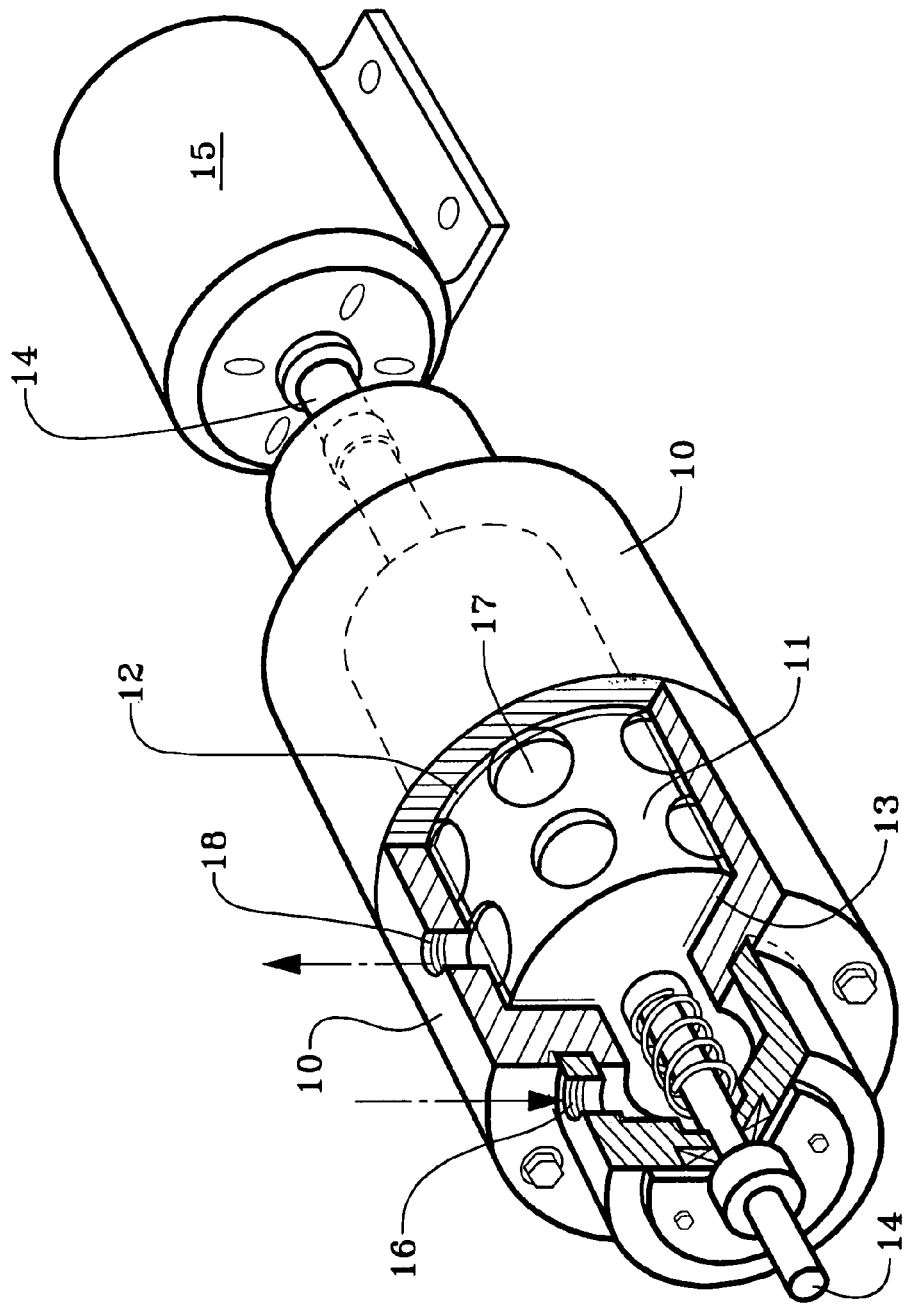
FIGS. 1a and 1b show variations of a cavitation device as utilized in our invention.
Figure 1B:
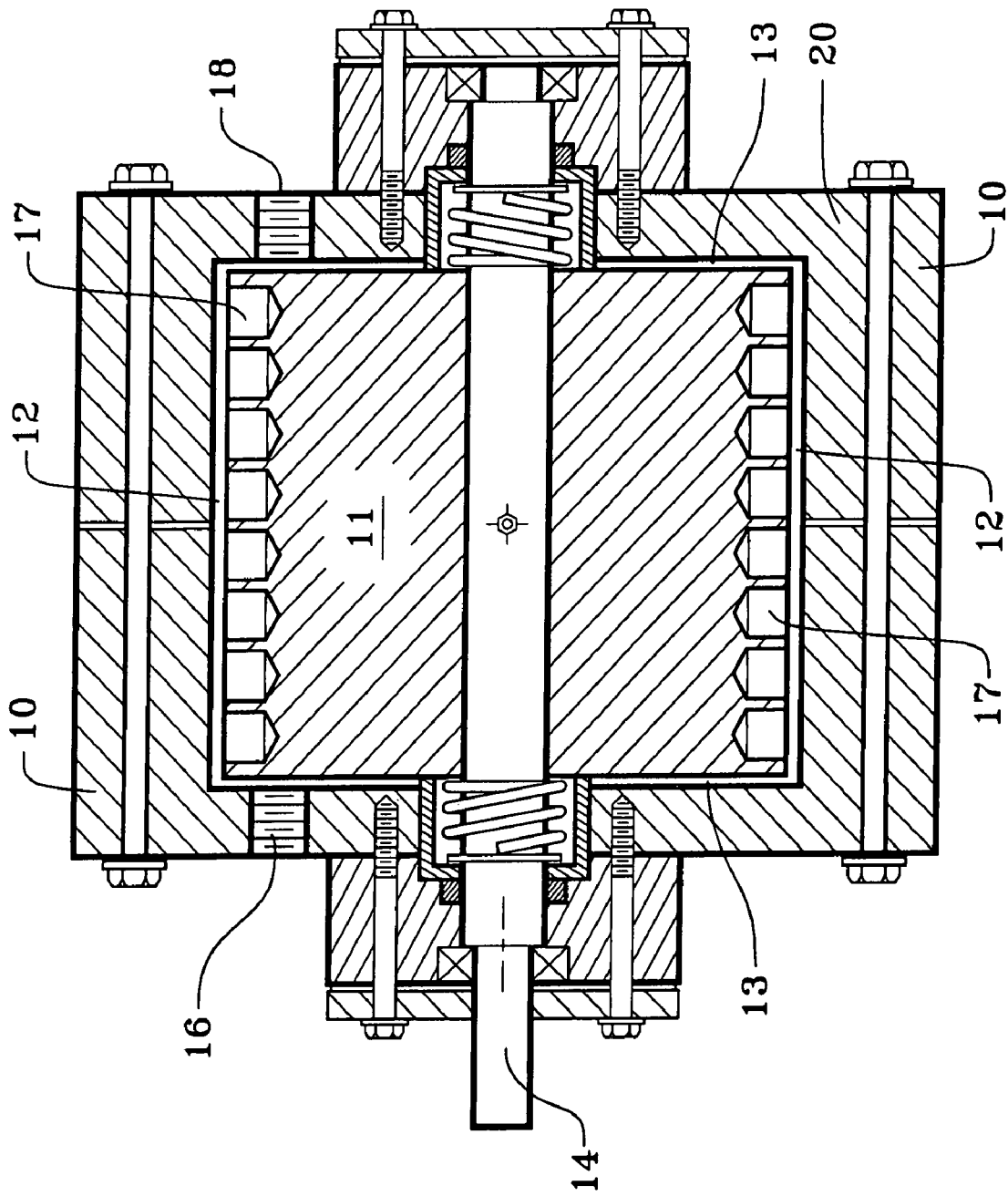

FIGS. 1a and 1b show two slightly different variations, and views, of the cavitation device, sometimes known as a cavitation pump, or a cavitation regenerator, and sometimes referred to herein as an SPR, which we use in our invention to regenerate solutions comprising heavy brine components.

Figure 2:
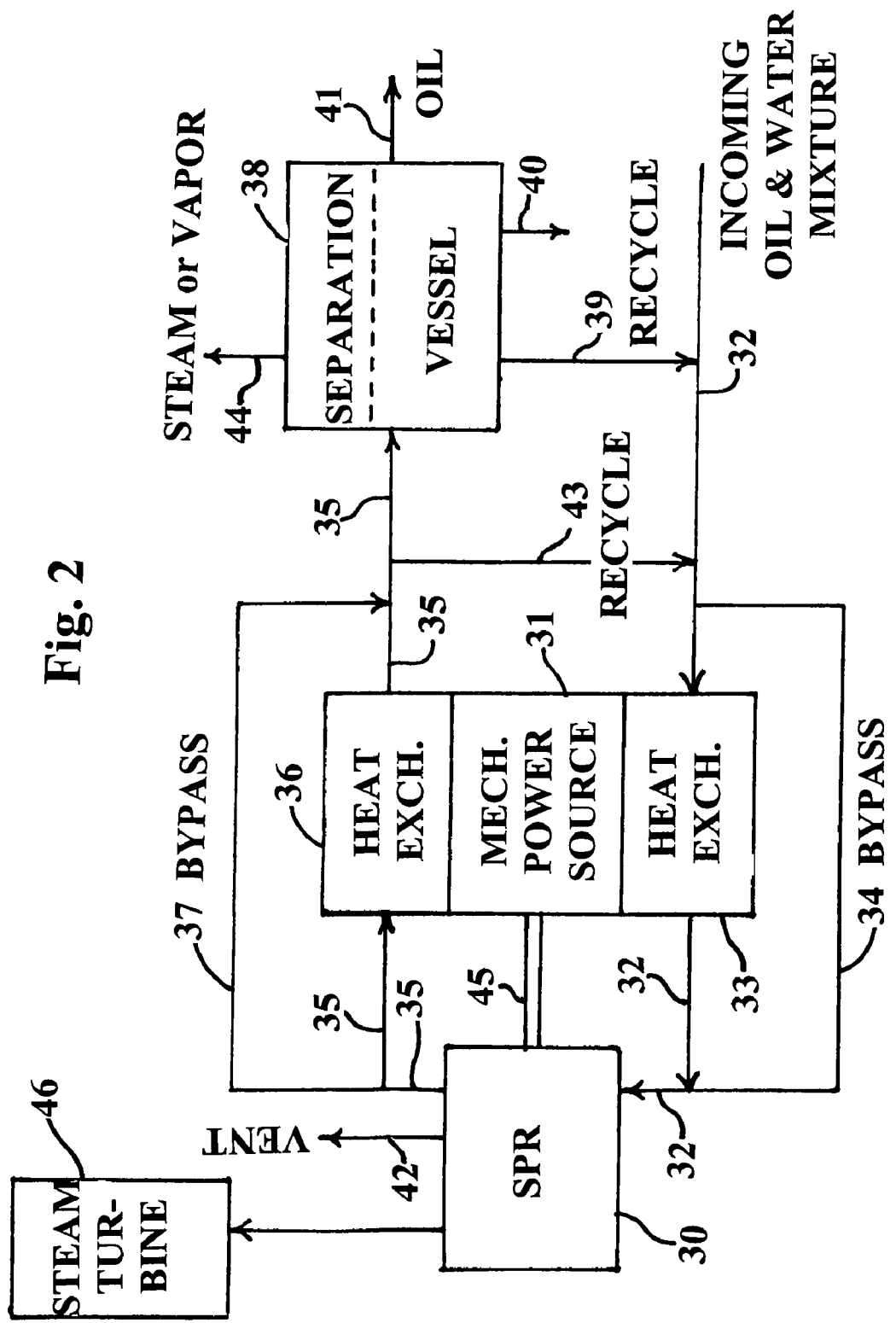
FIG. 2 is a flow sheet illustrating the process for separating an oil and water mixture.

FIGS. 1a and 1b are taken from FIGS. 1 and 2 of Griggs U.S. Pat. No. 5,188,090, which is incorporated herein by reference in its entirety along with related U.S. Pat. Nos. 5,385,298 and 5,957,122. As explained in the U.S. Pat. No. 5,188,090 and elsewhere in the referenced patents, liquid is heated in the device without the use of a heat transfer surface, thus avoiding the usual scaling problems common to boilers and distillation apparatus.

A housing 10 in FIGS. 1a and 1b encloses cylindrical rotor 11 leaving only a small clearance 12 around its curved surface and clearance 13 at the ends. The rotor 11 is mounted on a shaft 14 turned by motor 15. Cavities 17 are drilled or otherwise cut into the surface of rotor 11. As explained in the Griggs patents, other irregularities, such as shallow lips around the cavities 17, may be placed on the surface of the rotor 11. Some of the cavities 17 may be drilled at an angle other than perpendicular to the surface of rotor 11—for example, at a 15 degree angle. Liquid—in the case of the present invention, an emulsion or other mixture of oil and water—is introduced through port 16 under pressure and enters clearances 13 and 12. As the mixture passes from port 16 to clearance 13 to clearance 12 and out exit 18, areas of vacuum are generated and heat is generated within the mixture from its own turbulence, expansion and compression (shock waves). As explained at column 2 lines 61 et seq in the U.S. Pat. No. 5,188,090, "(T)he depth, diameter and orientation of (the cavities) may be adjusted in dimension to optimize efficiency and effectiveness of (the cavitation device) for heating various fluids, and to optimize operation, efficiency, and effectiveness . . . with respect to particular fluid temperatures, pressures and flow rates, as they relate to rotational speed of (the rotor 11)." Smaller or larger clearances may be provided (col. 3, lines 9-14). Also the interior surface of the housing 10 may be smooth with no irregularities or may be serrated, feature holes or bores or other irregularities as desired to increase efficiency and effectiveness for particular fluids, flow rates and rotational speeds of the rotor 11. (col. 3, lines 23-29) Rotational velocity may be on the order of 5000 rpm (col 4 line 13). The diameter of the exhaust ports 18 may be varied also depending on the fluid treated. Pressure at entrance port 16 may be 75 psi, for example, and the temperature at exit port 18 may be as high as 300° F., but need not exceed the boiling temperature of water at atmospheric pressure. Thus the oil and water mixture or emulsion may be flashed or otherwise treated in the cavitation device to remove water as steam or water vapor. Note that the position of exit port 18 is somewhat different in FIGS. 1a and 1b; likewise the position of entrance port 16 differs in the two versions.

Operation of the SPR (cavitation device) is as follows. A shearing stress is created in the fluid as it passes into the narrow clearance 12 between the rotor 11 and the housing 10. This shearing stress causes an increase in temperature. The solution quickly encounters the cavities 17 in the rotor 11, and tends to fill the cavities, but the centrifugal force of the rotation tends to throw the liquid back out of the cavity, which creates a vacuum. The vacuum in the cavities 17 draws liquid back into them, and accordingly "shock waves" are formed as the cavities are constantly filled, emptied and filled again. Small bubbles, some of them microscopic, are formed and imploded. All of this stress on the liquid generates heat which increases the temperature of the liquid dramatically. The design of the SPR ensures that, since the bubble collapse and most of the other stress takes place in the cavities, little or no erosion of the working surfaces of the rotor 11 takes place, and virtually all of the heat generated remains within the liquid.

Temperatures within the cavitation device—of the rotor 11, the housing 10 and its interior 20, and the fluid within the clearance spaces 12 between the rotor and the housing—remain substantially constant after the process is begun and while the feed rate and other variables are maintained at the desired values. There is no outside heat source; it is the mechanical energy of the spinning rotor that is converted to heat taken up by the solution and soon removed along with the solution when it is passes through exit 18. The rotor and housing indeed tend to be lower in temperature than the liquid in clearances 12 and 13. There is little danger of scale formation even with high concentrations of heavy brine components in the solution, mixture, or emulsion being processed.

Any solids present in the mixture, having dimensions small enough to pass through the clearances 12 and 13 may pass through the SPR unchanged except in concentration In FIG. 2, the oil and water mixture (hereafter sometimes the mixture) enters in line 32 from the right, as depicted. It may be any industrial oil and water mixture and, if it is an emulsion from a production well, it may come directly from the well, from a hold tank, or indirectly from another source. The SPR (Cavitation device) 30 requires a motor or engine to rotate it. Here, a Diesel engine or other power source 31, also labeled a Mech Power Source, powers the SPR through shaft 45 and generates hot exhaust gases, which are passed through the Heat Exchanger 33, where the thermal energy of the exhaust gas or other waste heat from the power source is used to heat the incoming fluid in line 32 through a heat exchange surface or other conventional or expedient manner. Optionally the heat exchanger may be omitted or bypassed in a line such as line 34. The incoming fluid continues through line 32 to the SPR 30 which may be any cavitation device described above; for illustrative purposes, it may be substantially as shown in FIGS. 1a and 1b. A supplemental pump, not shown, may assist the passage of the fluid mixture or emulsion. In the SPR 30, the mixture is heated as described with reference to FIGS. 1a and 1b, and the heated mixture or emulsion is passed through line 35 to another Heat Exchanger 36 such as a jacket on a motor or Diesel engine (usually the mechanical power source 31), to transfer more heat energy to the mixture. The mixture continues through line 35 to the Separation Vessel 38 which may be a flash tank, where steam is separated and removed through line 44. Alternatively or supplementally, steam or vapor may be vented from the SPR through a separate vent 42 to the atmosphere or drawn off directly from or in a similar vent associated with exit port 18 (FIGS. 1a and 1b). The steam from any of these lines or vents may be recycled in a known manner for thermal energy preservation, for condensing to make substantially pure water, put to other useful purposes, or simply flashed to the atmosphere. A steam turbine 46 is suggested as an example of the use of a steam engine for power generation. The heated fluid from the SPR may also bypass the heat exchanger 36, for example through line 37 leading to Separation Vessel 38. Heated mixture in line 35 is passed to Separation Vessel 38, which may be a flash tank or other vessel capable of separating vapor from the water in the liquid mixture, which is collected in the Separation Vessel 38. Optionally a vacuum may be drawn on the Separation Vessel 38 to assist in removing the vapor and steam. It is not essential that the temperature of the fluid exceed the boiling point of water, as a vacuum assist can facilitate the withdrawal of vapors. Concentrated fluid (including non-vaporized water having a higher concentration of ions, salts or other constituents) from the Separation Vessel 38, in line 39, can be recycled to the SPR, or it may, in line 40, be disposed of, used for its latent heat, or forwarded to another system for recovery of one or more of its constituents. Oil will tend to form a layer in the Separation Vessel 38, and this may be removed by draining or otherwise through a line 41 for whatever purpose the context of the system dictates; for example, where the oil is crude oil produced from a hydrocarbon-bearing formation, it may be sent to a holding tank or to a pipeline destined to a refinery. Other industrial oils will be used for other purposes, and often will be recycled.

Whether or not concentrated fluid from the SPR 30 bypasses the heat exchanger 36, some or all of it may be recycled through line 43 to the SPR. Supplemental optional pumps, filters, and valves, not shown, may be deployed throughout the system to assure the desired flow rates and pressures, and to direct the fluids in the system to and through the various options described; automatic or manual controls for the valves and pumps may also be installed.

As indicated in Hydro Dynamics U.S. Pat. No. 6,627,784, the introduction, by mixing in an SPR, of methane gas to an oil/water emulsion may promote the separation of the water from the oil. The methane interferes with the van der Waals attraction between the oil and water molecules. The present invention will take advantage of methane gas and/or any other gases (including non-hydrocarbon gases such as carbon dioxide and others) already present in the mixture or emulsion produced from downhole formations. When such an emulsion or mixture, containing or including co-produced gas, is passed into the SPR, any gas not already intimately mixed is reduced to microscopic bubbles and distributed uniformly throughout the mixture or emulsion at the same time the entire co-produced mixture or emulsion is heated by cavitation. While normally a mixing effect will tend to encourage emulsification, particularly where surfactants or emulsifiers are present, the intimate mixing of the gas with the two liquids at elevated temperatures accelerates the reduction of van der Waals attractions between the molecules of the two liquids in the emulsion. Under these conditions, the gas molecules may attach themselves to one of the liquids, inhibiting or blocking physical contact with the other liquid, and thereby assist the SPR-induced thermal effects separating the emulsion into its constituent components.

After the oil, gas and water (and any steam) exit the SPR, the gas may be drawn off separately from the liquid water, water vapor, steam, and oil, using thermal and/or gravity segregation means, or using other conventional gas separation means known in the art. The resulting gas can be flared or used as a source of energy at the wellsite. It can also be used in reinjection, enhanced recovery, or pressure maintenance operations, and/or transported away from the wellsite for utilization elsewhere.

Thus it is seen that our invention includes a method of recovering oil from a mixture of oil and water (which may be at least partly emulsified) produced from a well in a hydrocarbon-producing formation comprising passing said mixture through a cavitation device to increase its temperature, thereby forming at least some aqueous vapor from the mixture, separating the vapor from the mixture, and recovering produced oil from the remaining mixture by placing it in a vessel, allowing it to form a separate layer comprising oil in the vessel, and removing oil from the separate layer. A portion of the mixture may be recycled to the cavitation device to further increase its temperature, and/or a portion of the remaining mixture may be recycled from the vessel to the SPR to further heat, separate, and/or remove any remaining water from the oil. Vapor may be encouraged to separate from the vessel by drawing a negative pressure on it, and water obtained from the vapor may be used in a hydrocarbon recovery process or otherwise used as needed. Any water not vaporized can also be optionally drawn off from the vessel separately for disposal or further processing to remove ions, salts, or other constituents.

In addition, our invention includes a method of treating an oil and water emulsion comprising (a) heating the oil and water emulsion in a cavitation device, and (b) removing water from the emulsion by drawing water vapor or steam from the emulsion so heated. In the same manner, our invention is applicable to mixtures of oil and water, whether or not they are technically emulsions, and whether they might be classified as water-in-oil emulsions or oil-in-water emulsions. That is, we may remove water from a mixture or emulsion by heating the mixture or emulsion in a cavitation device and removing vapor or steam from the resulting heated fluid. The oil may be any kind of oil, although it most often will be an industrial oil or an oil such as is used in the hydrocarbon production industry. The oil should have a boiling point higher than water. Desirably, though not essentially, the oil will have a boiling point at least twenty degrees Fahrenheit higher than water. Generally it will have a boiling point of at least 230° F.; frequently at least 255° F. and most often at least 280° F. The ratio of oil to water can range from 99:1 to 1:99 by weight. The mixture or emulsion may be a produced fluid from a hydrocarbon production well. At least a portion of the heated fluid may be recycled to the cavitation device to further elevate its temperature. At least a portion of the heated mixture or emulsion may be passed to a flash tank or other separation vessel for removal of the vapor or steam, or the vapor or steam may be released through a vent in the cavitation device. In either case, removal of vapor or steam may be assisted by drawing a vacuum on the vent or separation vessel. If a flash tank is used as the separation vessel, for example, oil may be recovered from the flash tank by permitting it to separate in the tank and then drawing it off. At least a portion of the mixture or emulsion in the flash tank may be recycled to the cavitation device. Where the processed fluid is an oil and water mixture from a hydrocarbon production well, the oil drawn off from the flash tank or otherwise remaining after separation of water and/or vapor may be recovered as produced crude oil. Water obtained from the steam or vapor may be used for makeup in a new oil field fluid or other new industrial fluid or solution, or for any other purpose for which fresh water is used. In lieu of a flash tank, the water heated in the cavitation device can be evaporated in a cooling tower or other evaporator, or it can be used to power a turbine or otherwise for the recapture of its thermal energy. Any water not vaporized will have higher concentrations of solids, salts, ions or other constituents, and can be either separately disposed of, recycled through the SPR, used for its latent heat, or separately processed for recovery of one or more of its constituents.

The invention claimed is:

1. Method of treating an oil and water emulsion comprising (a) heating said oil and water emulsion in a cavitation device by creating a vacuum and forming shock waves which impart thermal energy to the emulsion, and generate water vapor or steam, and (b) removing water from said emulsion by drawing said water vapor or steam from the emulsion so heated.

2. Method of claim 1 wherein said oil and water emulsion is an industrial oil and water emulsion.

3. Method of claim 1 wherein said oil in said oil and water emulsion has a boiling point higher than water.

4. Method of claim 1 wherein the weight ratio of oil to water in said oil and water emulsion is from 1:99 to 99:1.

5. Method of claim 1 wherein said emulsion is a water-in-oil emulsion.

6. Method of claim 1 wherein said emulsion is an oil-in-water emulsion.

7. Method of claim 1 wherein said oil and water emulsion is a produced emulsion from one or more downhole formations.

8. Method of claim 1 wherein at least a portion of said emulsion is recycled to said cavitation device after step (a).

9. Method of claim 1 wherein at least a portion of said emulsion is passed to a flash tank after step (a), and wherein step (b) is performed in said flash tank.

10. Method of claim 9 wherein at least a portion of the oil in said emulsion in said flash tank separates from said emulsion to form an oil layer in said flash tank.

11. Method of claim 10 including the step of withdrawing oil from said oil layer.

12. Method of claim 9 wherein at least a portion of said emulsion in said flash tank is recycled to said cavitation device.

13. Method of recovering oil from a mixture of oil and water produced from a well from one or more downhole formations comprising passing said mixture through a cavitation device to increase its temperature, thereby creating a vacuum and forming shock waves which impart thermal energy to the mixture, and forming at least some aqueous vapor from said mixture, separating said vapor from said mixture, and recovering produced oil from the remaining mixture by placing it in a vessel, allowing it to form a separate layer comprising oil in said vessel, and removing oil from said separate layer.

14. Method of claim 13 including recycling said mixture of oil and water through said cavitation device to further increase its temperature.

15. Method of claim 13 including recycling at least a portion of said remaining mixture through said cavitation device.

16. Method of claim 13 wherein said mixture of oil and water at least partly comprises an emulsion.

17. Method of claim 13 wherein said mixture of oil and water also includes a gas and wherein said method includes the step of separating said gas from said mixture after passing said mixture through said cavitation device.

18. Method of claim 17 wherein water not vaporized from said mixture forms a second separate layer in the vessel and is removed from the vessel.

19. Method of claim 13 including recovering liquid water from said vapor.

20. Method of claim 19 wherein said liquid water is recovered from said vapor at least partly by drawing a negative pressure on said vessel.

21. Method of claim 19 wherein said liquid water is used as a source of fresh water.

22. Method of claim 13 wherein water not vaporized from said mixture forms a second separate layer in the vessel and is removed from the vessel.

* * * * *